US011787546B2

United States Patent
Jayaramu et al.

(10) Patent No.: US 11,787,546 B2
(45) Date of Patent: Oct. 17, 2023

(54) ADJUSTABLE SEAL FRAME FOR FLOOR MOUNTED CABIN ATTENDANT SEATS

(71) Applicant: AMI Industries, Inc., Colorado Springs, CO (US)

(72) Inventors: Apoorva Jayaramu, Bengaluru (IN); Nikhil Anthony Saldanha, Bengaluru (IN)

(73) Assignee: AMI Industries, Inc., Colorado Springs, CO (US)

( * ) Notice: Subject to any disclaimer, the term of this patent is extended or adjusted under 35 U.S.C. 154(b) by 98 days.

(21) Appl. No.: 17/345,602

(22) Filed: Jun. 11, 2021

(65) Prior Publication Data
US 2021/0387733 A1    Dec. 16, 2021

(30) Foreign Application Priority Data
Jun. 13, 2020   (IN) ............................. 202041024885

(51) Int. Cl.
*B64D 11/06*    (2006.01)

(52) U.S. Cl.
CPC ................ *B64D 11/0691* (2014.12)

(58) Field of Classification Search
CPC ............ B64D 11/0647; B64D 11/0691; B64D 11/0698; B64D 11/0636; B64D 11/0602; B60N 2/015; B60N 2/546
See application file for complete search history.

(56) References Cited

U.S. PATENT DOCUMENTS

| 2,702,074 | A |   | 2/1955  | Vincent |
|-----------|---|---|---------|---------|
| 3,181,912 | A |   | 5/1965  | Martinus |
| 4,058,341 | A | * | 11/1977 | Prins ........................ A47C 4/44 |
|           |   |   |         | 297/39 |
| 8,454,085 | B1 |  | 6/2013  | Hsu |
| 8,814,268 | B2 |  | 8/2014  | Mineta et al. |
| 9,873,510 | B2 |  | 1/2018  | Ferguson |
| 2017/0283072 | A1 | * | 10/2017 | Ferguson ............. B64D 11/062 |

FOREIGN PATENT DOCUMENTS

| DE | 3442863 C1 | 3/1986 |
| DE | 19725354 A1 | 12/1998 |
| GB | 194923 A | 3/1923 |
| WO | WO-2016202772 A1 * | 12/2016 ........... B60N 2/3047 |

OTHER PUBLICATIONS

Extended Search Report for European Application No. 21179334.4 dated Nov. 4, 2021, 8 pages.

* cited by examiner

*Primary Examiner* — Richard Green
*Assistant Examiner* — Ashesh Dangol
(74) *Attorney, Agent, or Firm* — Suiter Swantz pc llo

(57) ABSTRACT

A floor mounted aircraft seat seal frame includes a frame, displacing elements connecting the frame to the posterior of the seat, and fabric tensioning elements that keep a gap covering fabric connected to the posterior surface of the seat in tension around the frame. The frame displacing elements, which may be leaf springs, coil springs, or manually adjustable element, allow the frame to conform to a wall behind the seat, regardless of the tapering of the wall.

20 Claims, 7 Drawing Sheets

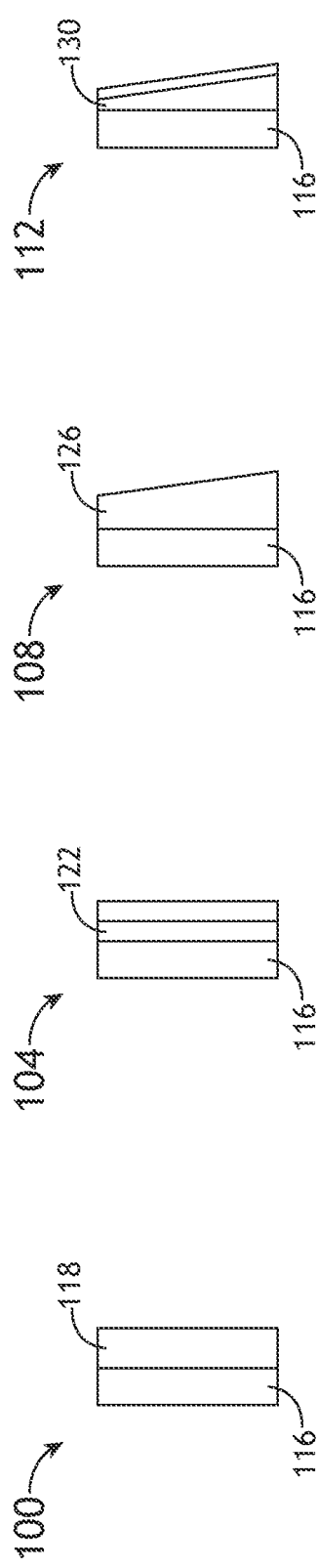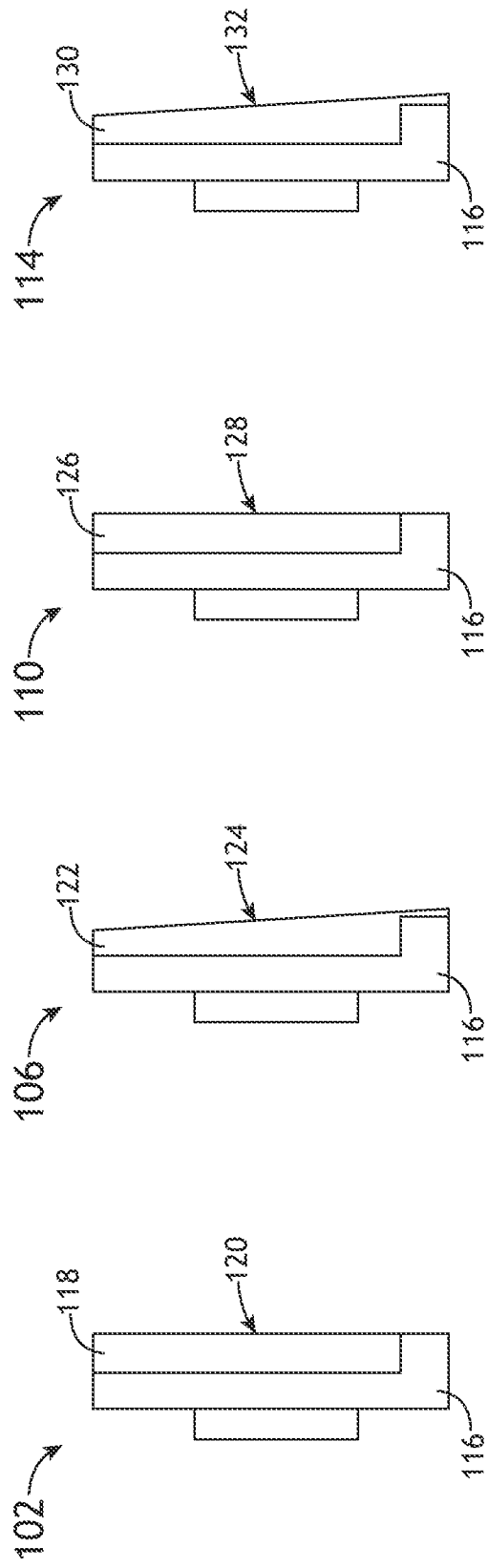

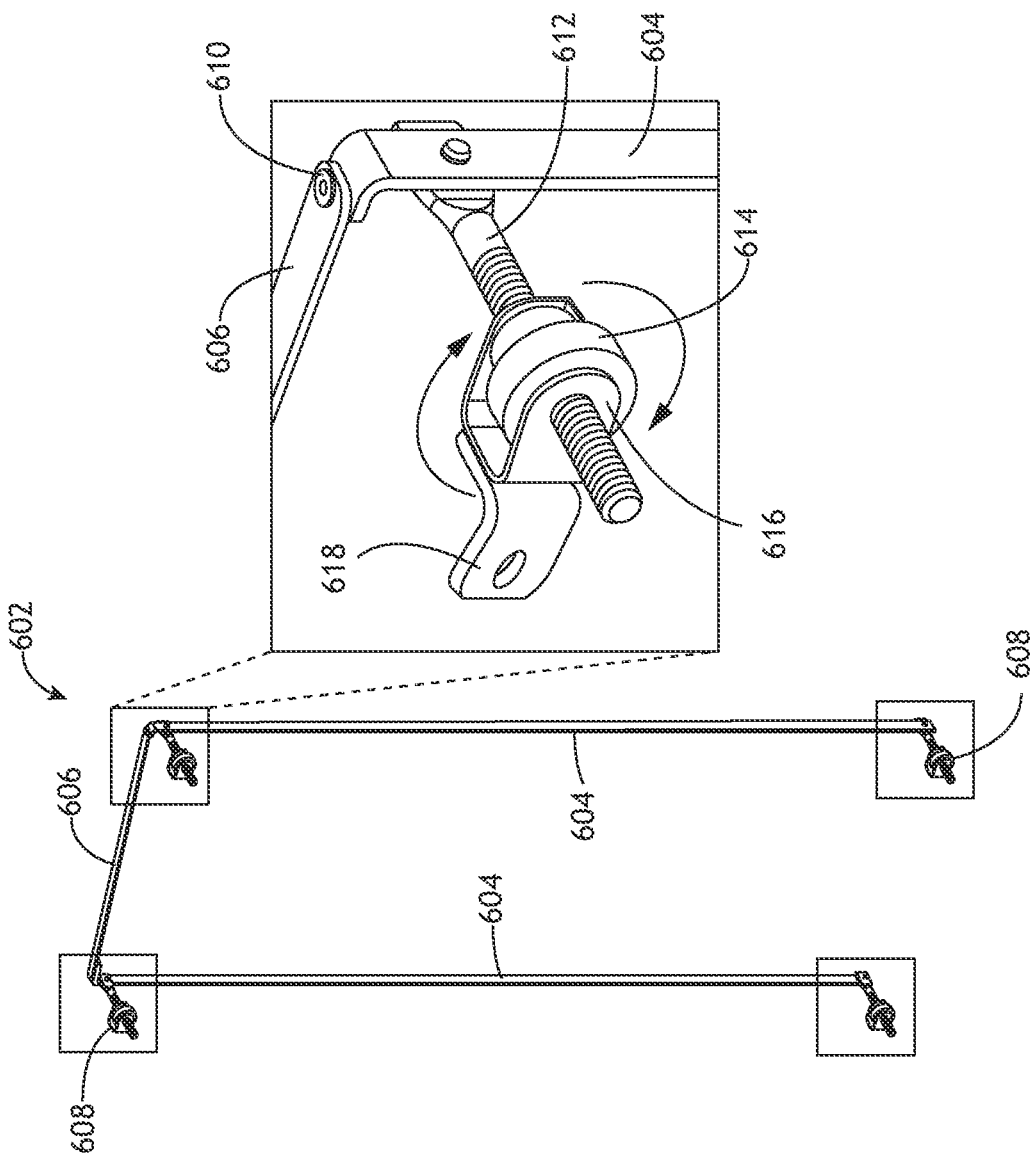
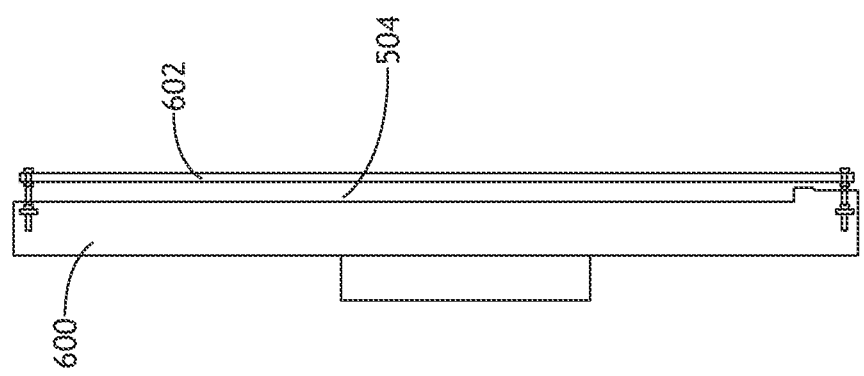
FIG.6B
FIG.6A

US 11,787,546 B2

ADJUSTABLE SEAL FRAME FOR FLOOR MOUNTED CABIN ATTENDANT SEATS

PRIORITY

The present application claims the benefit under 35 U.S.C. § 119(a) of Indian App. No. 202041024885 (filed Jun. 13, 2020), which is incorporated herein by reference.

BACKGROUND

Floor mounted cabin attendant seats leave a gap between the posterior surface of the seat of the nearest cabin wall or bulkhead. That gap may be covered by a seal frame that abuts the wall and supports fabric (leather, cloth, sheet metal, etc.) to cover and obscure the gap. The gap is often irregular, tapering side-to-side, top-to-bottom, or both; furthermore, such irregularity may be different from one aircraft to another, or at different locations within the same aircraft.

Generally, such irregularities require different gap covers for every individual scenario. Producing and fitting different gap covers increases design time, material needs, and installation complexity.

SUMMARY

In one aspect, embodiments of the inventive concepts disclosed herein are directed to a floor mounted aircraft seat seal frame having a frame, displacing elements connecting the frame to the posterior of the seat, and fabric tensioning elements that keep a gap covering fabric connected to the posterior surface of the seat in tension around the frame. The frame displacing elements allow the frame to conform to a wall behind the seat, regardless of the tapering of the wall.

In a further aspect, the displacement elements are leaf springs or coil springs. Alternatively, they may be manually adjustable threaded elements.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 1A shows a block representation of a top view and a side view of a floor mounted aircraft seat and seal frame according to an exemplary embodiment;

FIG. 1B shows a block representation of a top view and a side view of a floor mounted aircraft seat and seal frame according to an exemplary embodiment;

FIG. 1C shows a block representation of a top view and a side view of a floor mounted aircraft seat and seal frame according to an exemplary embodiment;

FIG. 1D shows a block representation of a top view and a side view of a floor mounted aircraft seat and seal frame according to an exemplary embodiment;

FIG. 6A shows a block representation of a side view of a floor mounted aircraft seat and seal frame according to an exemplary embodiment;

FIG. 6B shows a perspective and a detail view of a seal frame according to an exemplary embodiment;

DETAILED DESCRIPTION

Figure 2:
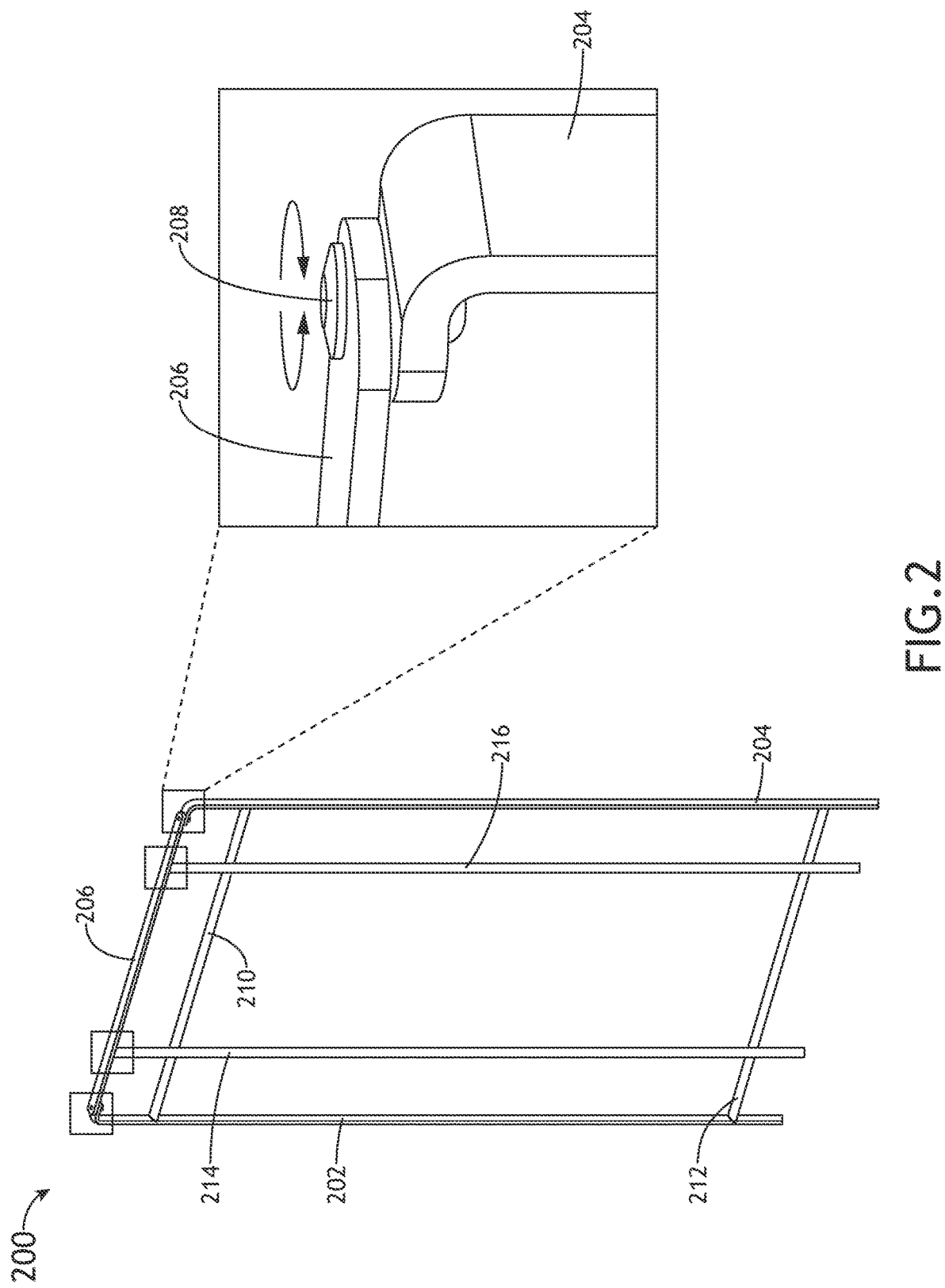
FIG. 2 shows a perspective view and a detail view of a frame according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a floor mounted aircraft seat seal frame having a frame, displacing elements connecting the frame to the posterior of the seat, and fabric tensioning elements that keep a gap covering fabric connected to the posterior surface of the seat in tension around the frame. The frame displacing elements allow the frame to conform to a wall behind the seat, regardless of the tapering of the wall.

Referring to FIGS. 1A-1D, block representations of top views 100, 104, 108, 112 and side views 102, 106, 110, 114 of a floor mounted aircraft seat 116 and seal frame 118, 122, 126, 130 according to exemplary embodiments are shown. In one orientation, such as in FIG. 1A, the posterior surface of the floor mounted aircraft seat 102 may be substantially parallel to the corresponding wall 120 such that the seal frame 118 does not need to taper. Alternatively, such as in FIG. 1B, the wall 124 may be angled top to bottom with respect to the posterior surface of the floor mounted aircraft seat 102 such that the seal frame 122 must extend further at the bottom than the top, but maintains a substantially constant cross-section from side to side. Alternatively, such as in FIG. 1C, the wall 128 may be angled side to side with respect to the posterior surface of the floor mounted aircraft seat 102 such that the seal frame 126 must extend on one side than the other, but maintains a substantially constant cross-section from top to bottom. Alternatively, such as in FIG. 1D, the wall 132 may be angled top to bottom and side to side with respect to the posterior surface of the floor mounted aircraft seat 102 such that the seal frame 130 must extend different distances at each corner. Traditionally, a floor mounted aircraft seat 102 would require separately engineered seal frames 118, 122, 126, 130 to account for each alternative, and potentially different degrees of each alternative depending on the aircraft and location within the aircraft.

Referring to FIG. 2, a perspective view and a detail view of a frame 200 according to an exemplary embodiment is shown. The frame 200 comprises two vertical elements 202, 204, each of the vertical elements 202, 204 connected at a terminal to at least one horizontal element 206. In at least one embodiment, the vertical elements 202, 204 are connected to the horizontal element 206 via a pivot joint 208 such that the vertical elements 202, 204 may pivot as necessary provide a flat surface to abut an aircraft wall when installed, no matter how the frame 200 is oriented with respect to the corresponding floor mounted aircraft seat. The interface between such flat surface and aircraft wall would include a fabric element as more fully described herein.

In at least one embodiment, the frame 200 includes a plurality of rigid fabric connection strips 210, 212, 214, 216. The rigid fabric connection strips 210, 212, 214, 216 may be disposed substantially parallel to the vertical elements 202, 204 and horizontal elements 206.

Figure 3B:
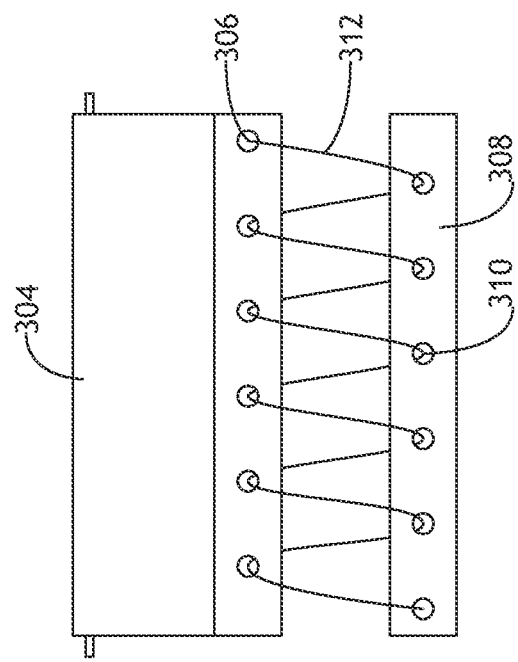
FIG. 3B shows a detail view of a fabric tensioning element according to an exemplary embodiment.
Figure 3A:
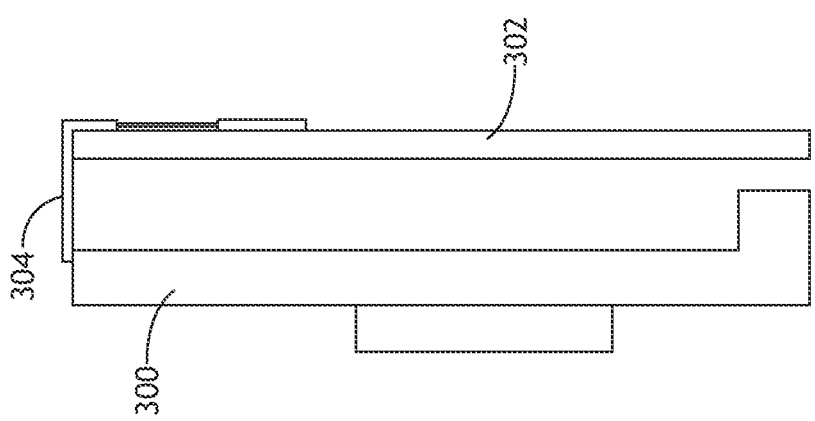
FIG. 3A shows a block representation of a side view of a floor mounted aircraft seat and seal frame according to an exemplary embodiment.

Referring to FIGS. 3A-3B, a block representation of a side view of a floor mounted aircraft seat 300 and seal frame 302, and a detail view of a fabric tensioning element according to an exemplary embodiment are shown. The fabric tensioning element may comprise one or more rigid fabric connection strips 308 that each define a plurality of holes 310 or other features suitable for receiving or attaching an elastic element 312 such as an elastic cord. A gap covering fabric 304, affixed to the posterior surface of the floor mounted aircraft seat 300 may extend around one or more edges of the frame 302. Each edge of the gap covering fabric 304 may define a plurality of holes 306 or other features suitable for receiving or attaching the elastic element 312. The gap covering fabric 304 is thereby elastically attached the rigid fabric connection strips 308.

In at least one embodiment, the gap covering fabric holes 306 may be protected gromets or other edge protecting feature to distribute the load applied by the elastic element 312.

Figure 4B:
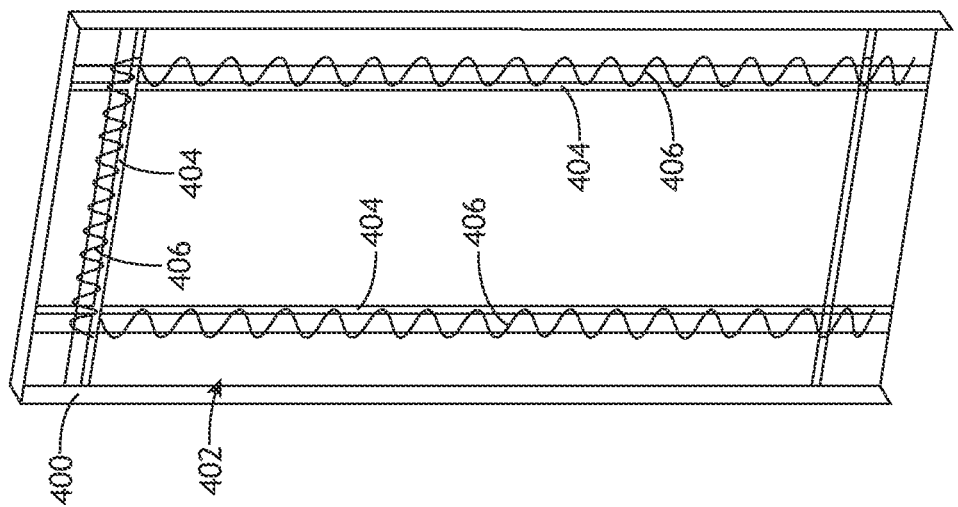
FIG. 4B show a perspective view of a seal frame according to an exemplary embodiment.
Figure 4A:
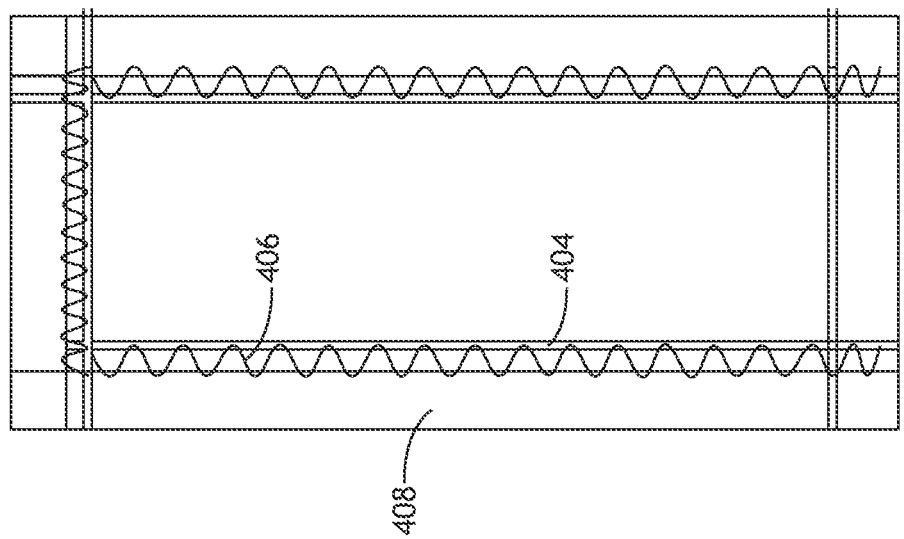
FIG. 4A show a rear view of a seal frame according to an exemplary embodiment.

Referring to FIGS. 4A-4B, a rear view and a perspective view of a seal frame according to an exemplary embodiment are shown. A gap covering fabric 400, extending from a posterior surface of a floor mounted aircraft seat, wraps around one or more edges of a frame 402 and connects to corresponding rigid fabric connection strips 404 via one or more elastic elements 406. In actual application, the frame 402 may be displaced from the posterior surface of the floor mounted aircraft seat in an irregular fashion. The elastic elements 406 maintain tension of the gap covering fabric 400 no matter how the edges of the frame 402 are displaced. It may be appreciated that the disposition of the rigid fabric connection strips 404 and elastic elements 406 may maintain a set amount of tension on gap covering fabric 404 even when the frame 402 is minimally displaced.

Furthermore, the gap covering fabric 400 extending around the edges of the frame 402 provides a barrier between the frame 402 and the corresponding wall, preventing wear on the wall, especially where the frame 402 comprises metal.

Figures 5A, 5B:
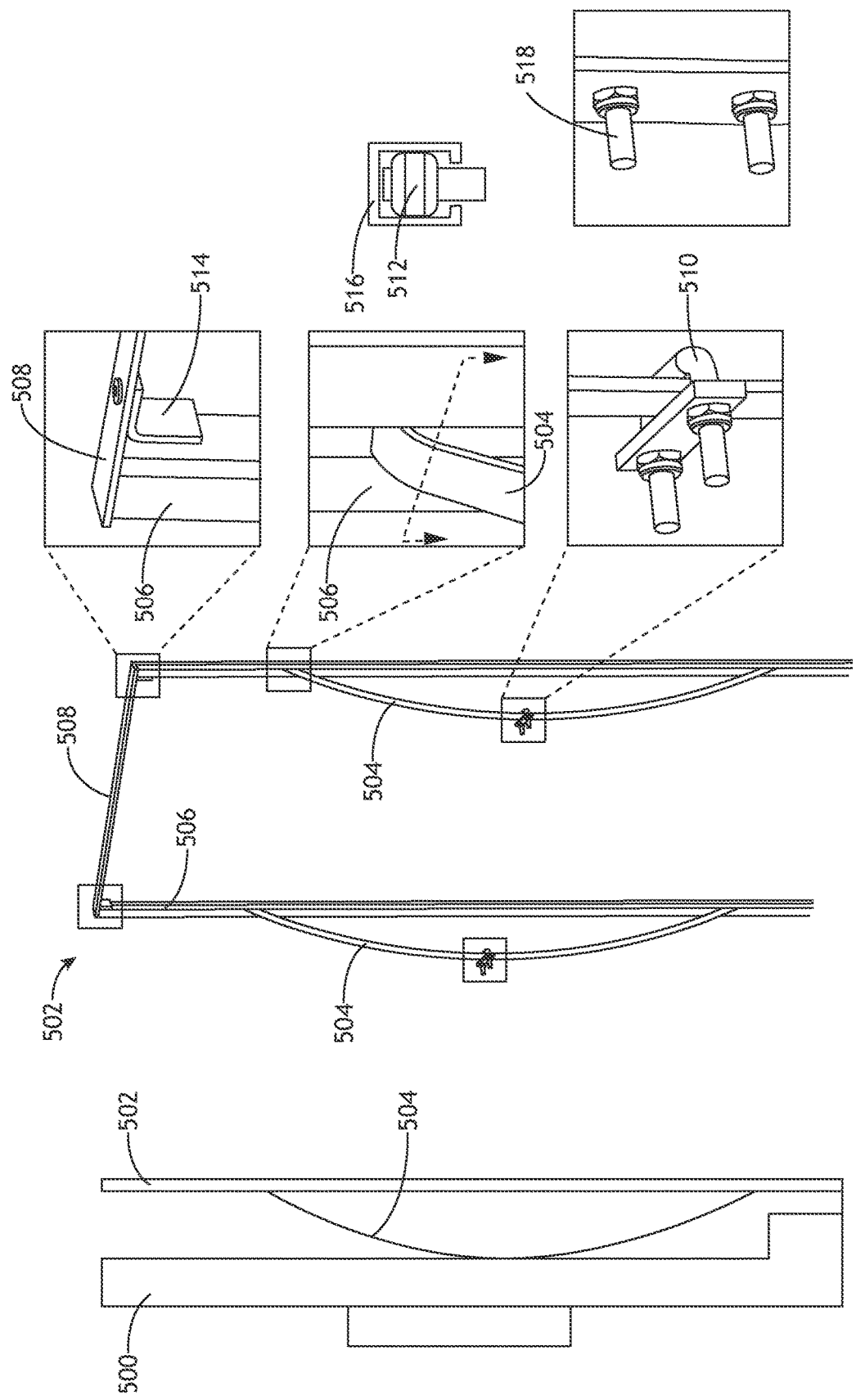
FIG. 5A shows a block representation of a side view of a floor mounted aircraft seat and seal frame according to an exemplary embodiment.
FIG. 5B shows a perspective and detail views of a seal frame according to an exemplary embodiment.

Referring to FIGS. 5A-5B, a block representation of a side view of a floor mounted aircraft seat 500 and seal frame, and a perspective and detail views of a seal frame according to an exemplary embodiment are shown. A frame 502 connected to a posterior surface of the floor mounted aircraft seat 500 comprises two vertical elements 506 and one or more horizontal elements 508 connected to each other via pivoting elements 514 at their respective terminuses. The pivoting elements 514 allow the vertical elements 506 to abut the wall with a flat surface.

In at least one embodiment, leaf springs 504 are connected to each of the vertical elements 506 at two points, each point comprising a close C-section portion 516 of the frame 502 to retain the corresponding portion of the leaf spring 504. For example, each leaf spring 504 may engage upper and lower bushings 512 in the corresponding vertical element 506, retained by the C-section portion 516.

In at least one embodiment, each leaf spring 504 is connected to the posterior surface of the floor mounted aircraft seat 500 via a bracket 510 configured to allow the corresponding leaf spring 504 to translate up or down or a plurality of bolts 518 passing through corresponding holes in the center of the spring. Translation of the leaf springs within the frame allows the vertical elements 506 to reorient and conform to the vertical taper of the abutting aircraft wall. Furthermore, the force applied by the leaf springs 504 biases each vertical element 506 to contact the aircraft wall even if the aircraft wall has a complex taper that vertical elements 506 to extend different distances. Finally, the pivoting elements 514 allow the top of the frame 502 to have a different horizontal taper than the bottom of the frame 502; or to put it another way, the two leaf springs 504 may have different translations with respect to the corresponding bracket 510 such that each vertical element 506 has a different vertical angle as well as a different displacement form the posterior surface of the floor mounted aircraft seat 500.

Referring to FIGS. 6A-6B, a block representation of a side view of a floor mounted aircraft seat 600 and seal frame, and a perspective and a detail view of a seal frame according to an exemplary embodiment are shown. A frame 602 connected to a posterior surface of the floor mounted aircraft seat 600 comprises vertical elements 604 and one more horizontal elements 606 connected to each other via pivoting elements 610 at their respective terminuses. The pivoting elements 610 allow the vertical elements 604 to displace independently from the posterior surface of the floor mounted aircraft seat 600 without placing torsional stress of the elements connecting the frame 602 to the floor mounted aircraft seat 600.

In at least one embodiment, manually adjustable linear actuators 608 connect the frame 602 to the floor mounted aircraft seat 600 at points generally proximal to the corners of the frame 602. The manually adjustable linear actuators 608 may comprise a threaded eyebolt 612 pivotably affixed to the corresponding vertical element 604 or horizontal element 606. Furthermore, a mounting bracket 616 is affixed to a corresponding location on the floor mounted aircraft seat 600 with the threaded portion of the eyebolt 612 passing through. The mounting bracket 616 is free to rotate about a through-hole pivotably connecting the mounting bracket 616 to a back-skin bracket 618, allowing the frame 602 to conform to the corresponding aircraft wall. A threaded adjusting wheel 614 disposed within the mounting bracket 616 and engaging the threaded portion of the eyebolt 612 allows the eyebolt 612 to be manually adjusted in or out, and thereby dictate the shape of the frame 602. Such adjustments would be made at the time of installation and should not be necessary afterwards.

Figure 7:
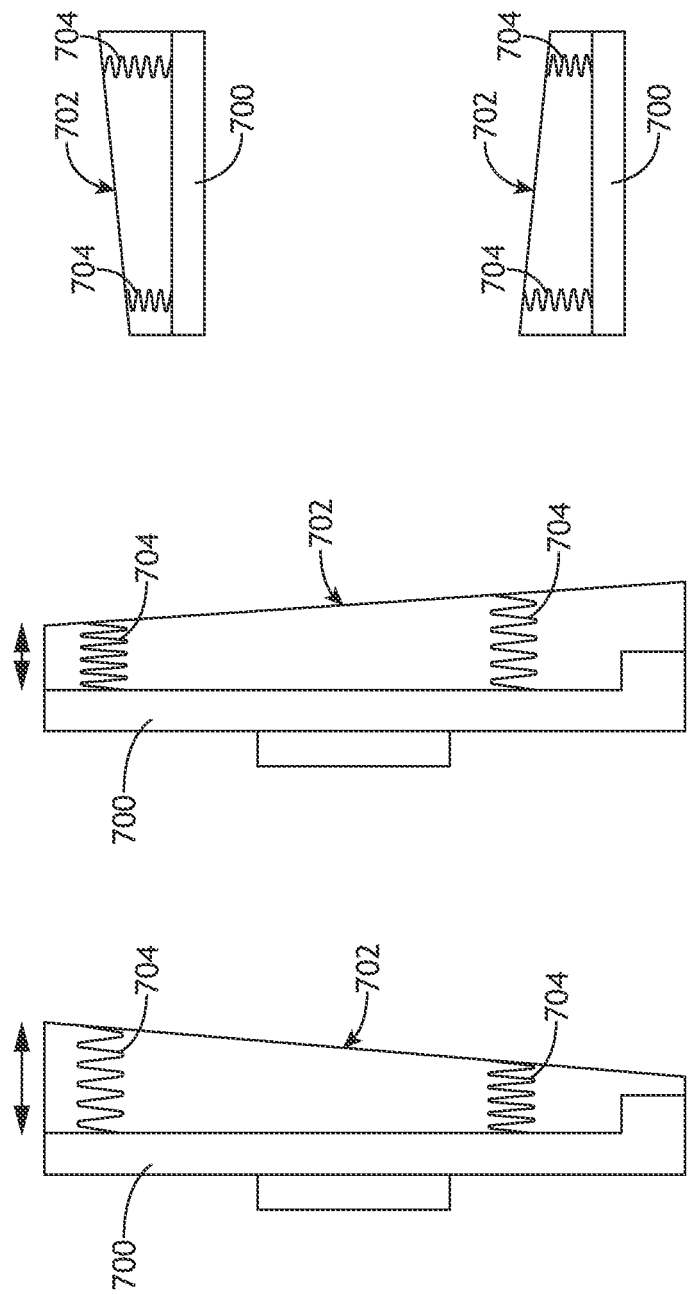
FIG. 7 shows various block representations of side views and top views of a floor mounted aircraft seat and seal frame according to an exemplary embodiment.

Referring to FIG. 7, various block representations of side views and top views of a floor mounted aircraft seat 700 and seal frame according to an exemplary embodiment are shown. A frame connected to a posterior surface of the floor mounted aircraft seat 700 may be displaced via compression or coil springs 704 disposed proximal to the corners of the frame. Provided the aircraft wall 702 is always within a distance of maximum extension of the coil springs 704, the frame may be automatically displaced and oriented to conform to the vertical and horizontal taper of the wall 702.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A seal frame for a floor mounted aircraft seat comprising a gap covering fabric element to cover a gap between the floor mounted aircraft seat and a cabin wall, the seal frame comprising:
    a frame;
    at least two frame displacing elements; and
    one or more fabric tensioning elements,
    wherein:
        the at least two frame displacing elements are configured to independently displace vertical edges of the frame and independently displace horizontal edges of the frame to support the gap covering fabric element covering the gap between the floor mounted aircraft seat and the cabin wall regardless of variability in the gap.

2. The seal frame of claim 1, wherein the one or more fabric tensioning elements comprise:
    a plurality of rigid fabric connection strips disposed about the frame, each defining a plurality of elastic connection elements; and
    a plurality of elastic cords, each configured to elastically connect an edge of the gap covering fabric element to one or more of the rigid fabric connection strips via the elastic connection elements.

3. The seal frame of claim 1, wherein the at least two frame displacing elements each comprise a leaf spring.

4. The seal frame of claim 1, wherein the at least two frame displacing elements comprise four linear actuators, each disposed proximal to a corner of the frame.

5. The seal frame of claim 4, wherein the linear actuator comprises a compression spring.

6. The seal frame of claim 1, wherein the at least two frame displacing elements comprises four manually adjustable extension elements, each disposed proximal to a corner of the frame.

7. The seal frame of claim 1, wherein:
    the frame comprises two vertical elements and one or more horizontal elements; and
    each vertical element is pivotably connected at a terminal to a terminal of a horizontal element.

8. An aircraft seat comprising:
    at least one gap covering fabric element affixed to a posterior surface of the aircraft seat; and
    a seal frame comprising:
        a frame;
        at least two frame displacing elements; and
        one or more fabric tensioning elements elastically connected to the at least one gap coving fabric element,
    wherein:
        the at least two frame displacing elements are configured to independently displace vertical edges of the frame and independently displace horizontal edges of the frame to support the gap covering fabric element covering the gap between the aircraft seat and a cabin wall regardless of variability in the gap; and
        the aircraft seat is configured to be floor mounted with the posterior surface proximal to the cabin wall.

9. The aircraft seat of claim 8, wherein the one or more fabric tensioning elements comprise:
    a plurality of rigid fabric connection strips disposed about the frame, each defining a plurality of elastic connection elements; and
    a plurality of elastic cords, each configured to elastically connect an edge of the at least one gap covering fabric element to one or more of the rigid fabric connection strips via the elastic cord connection elements.

10. The aircraft seat of claim 8, wherein the at least two frame displacing elements each comprise a leaf spring.

11. The aircraft seat of claim 8, wherein the at least two frame displacing elements comprise four linear actuators, each disposed proximal to a corner of the frame.

12. The aircraft seat of claim 11, wherein the linear actuator comprises a compression spring.

13. The aircraft seat of claim 8, wherein the at least two frame displacing elements comprises four manually adjustable extension elements, each disposed proximal to a corner of the frame.

14. The aircraft seat of claim 8, wherein:
the frame comprises two vertical elements and one or more horizontal elements; and
each vertical element is pivotably connected at a terminal to a terminal of a horizontal element.

15. An aircraft seat comprising:
at least one gap covering fabric element affixed to a posterior surface of the aircraft seat; and
a seal frame comprising:
a frame;
at least two frame displacing elements;
a plurality of rigid fabric connection strips disposed about the frame, each defining a plurality of elastic connection elements; and
a plurality of elastic cords, each configured to elastically connect an edge of the at least one gap covering fabric element to one or more of the rigid fabric connection strips via the elastic connection elements, wherein:
the at least two frame displacing elements are configured to independently displace vertical edges of the frame and independently displace horizontal edges of the frame to support the gap covering fabric element covering the gap between the aircraft seat and a cabin wall regardless of variability in the gap; and
the aircraft seat is configured to be floor mounted with the posterior surface proximal to the cabin wall.

16. The aircraft seat of claim 15, wherein the at least two frame displacing elements each comprise a leaf spring.

17. The aircraft seat of claim 15, wherein the at least two frame displacing elements comprise four linear actuators, each disposed proximal to a corner of the frame.

18. The aircraft seat of claim 17, wherein the linear actuator comprises a compression spring.

19. The aircraft seat of claim 15, wherein the at least two frame displacing elements comprises four manually adjustable extension elements, each disposed proximal to a corner of the frame.

20. The aircraft seat of claim 15, wherein:
the frame comprises two vertical elements and one or more horizontal elements; and
each vertical element is pivotably connected at a terminal to a terminal of a horizontal element.

* * * * *